US005507439A

United States Patent [19]
Story

[11] Patent Number: 5,507,439
[45] Date of Patent: Apr. 16, 1996

[54] METHOD FOR MILLING A POWDER

[75] Inventor: Phillip M. Story, Yukon, Okla.

[73] Assignee: Kerr-McGee Chemical Corporation, Oklahoma City, Okla.

[21] Appl. No.: 336,897

[22] Filed: Nov. 10, 1994

[51] Int. Cl.⁶ .................................................. B02C 19/06
[52] U.S. Cl. ....................................... 241/5; 241/26
[58] Field of Search ................................. 241/5, 39, 30, 241/24, 26; 209/127.1–131

[56] References Cited

U.S. PATENT DOCUMENTS

| | | |
|---|---|---|
| 2,828,011 | 3/1958 | Whitby . |
| 3,493,109 | 2/1970 | Carta et al. . |
| 3,591,093 | 7/1971 | Berthon et al. ............... 241/24 X |
| 3,638,058 | 1/1972 | Fritzius . |
| 3,641,740 | 2/1972 | Schumann et al. . |
| 3,751,715 | 8/1973 | Edwards . |
| 3,933,626 | 1/1976 | Stukel et al. . |
| 3,963,606 | 6/1976 | Hogg . |
| 3,969,225 | 7/1976 | Horowitz . |
| 3,970,546 | 7/1976 | Webb et al. . |
| 3,990,797 | 11/1976 | Neukermans et al. . |
| 4,047,183 | 9/1977 | Taub . |
| 4,148,718 | 4/1979 | Fulwyler . |
| 4,251,353 | 2/1981 | Knoll . |
| 4,299,693 | 11/1981 | Paulson . |
| 4,312,748 | 1/1982 | Rozmus . |
| 4,318,480 | 3/1982 | Lombardo et al. . |
| 4,549,659 | 10/1985 | Hawkins et al. . |
| 4,792,098 | 12/1988 | Haddow . |
| 4,921,542 | 5/1990 | Rademachers et al. . |
| 5,006,226 | 4/1991 | Burt, Jr. . |

FOREIGN PATENT DOCUMENTS

| | | | |
|---|---|---|---|
| 162906 | 12/1985 | European Pat. Off. . | |
| 1279572 | 10/1968 | Germany | ............ 241/24 |
| 321803 | 11/1983 | Germany . | |
| 4040561 | 7/1992 | Germany . | |
| 660714 | 5/1979 | U.S.S.R. | ............ 241/24 |
| 910203 | 7/1986 | U.S.S.R. | ............ 241/24 |

*Primary Examiner*—Mark Rosenbaum
*Attorney, Agent, or Firm*—J. Rodgers Lunsford, III; Herbert M. Hanegan

[57] ABSTRACT

A method for producing a milled powder including imparting an electrostatic charge to the starting powder and milling the electrostatically charged starting powder is provided.

20 Claims, No Drawings

METHOD FOR MILLING A POWDER

BACKGROUND OF THE INVENTION

1. Field of the Invention

The invention relates to a method for milling a powder including electrostatically charging the powder before the milling step is performed.

2. Description of the Prior Art

Commercially useful powders including pigments, fillers and waxes typically undergo micronizing as a final processing step before collection and packaging of the powders. Micronizing refers to comminution of a starting powder to produce a product powder having a particle size in the submicron range, usually in the range of from about 0.01μ to about 1.0μ. Fluid energy mills are commonly used to perform this micronizing step. Fluid energy mills use a high pressure fluid such as a high pressure gas stream to impart shear forces to the starting powder to be micronized, thereby reducing particle size to the desired submicron particle size range.

Milling aids may be introduced into the fluid energy mill to improve the efficiency of the micronizing process so that less power needs to be expended to achieve a particular degree of grind. While milling aids and/or their residues have the desirable effect of improving milling efficiency, these milling aids become incorporated in the product powder and, depending upon the end use of the product powder, can lead to undesirable side reactions. For example, when a product powder, including residual milling aids is used as a pigment in an acid-catalyzed paint system, unwanted chemical reactions such as premature initiation of the epoxy-curing reaction in epoxy-based coating systems can occur. Also, when the product powder is used as a pigment or filler in a plastic, milling aid residue can be volatilized in high temperature plastic processing to generate undesirable vapors.

Collection of micronized product powders for packaging is made especially difficult because of the small particle size of the micronized powders. Micronized powders are conventionally collected using a bag filter or cyclone collector or, rarely, using an electrostatic precipitator. Currently, the extent to which a starting powder can be micronized is limited by collection efficiency for the micronized powder.

Thus, there exists a need for a method for efficiently milling a starting powder without the use of additives whose residues can cause undesirable reactions when the powder is used in a particular application. It is also required that the milling method not further complicate collection of the milled product powder and preferred that the milling method also improve collection efficiency of the product powder.

SUMMARY OF THE INVENTION

The invention provides a method for milling a powder including steps of providing a starting powder; imparting an electrostatic charge to the starting powder to form a charged powder and milling the charged powder to produce a milled powder.

An object of this invention is providing a method for milling a powder efficiently so that the amount of power required to produce a specified particle size or degree of grind is minimized without the use of additives and so that ease and efficiency of collection of the milled powder is improved.

Other and further objects, features and advantages of the present invention will be readily apparent to those skilled in the art upon reading the description of preferred embodiments which follows.

DESCRIPTION OF PREFERRED EMBODIMENTS

The invention provides a method for efficient milling of a starting powder without the use of additives by imparting an electrostatic charge to the starting powder before milling.

According to a preferred embodiment of the invention, a second starting powder can be provided, electrostatically charged to form a second charged powder having an electrostatic charge opposite to that of the charged powder, milled to produce a second milled powder and combined with the milled powder to form a product powder which is finally collected. The product powder can be collected using a product powder collector such as a cyclone, a bag filter or a settling chamber.

The starting powder can be non-electrically conductive and can be made up of insulating particles. As used herein in the specification and claims, the term "electrically conductive" is used to refer to a powder having an electrical resistivity in the range of from about 0μ ohms-cm to about 200,000μ ohms-cm, while the terms "electrically non-conductive" and "insulating" are used to refer to powders and individual particles of a powder having an electrical resistivity greater than about 200,000μ ohms-cm. The starting powder particles can also be characterized by a dielectric constant greater than about 1.5 as measured at $1.0 \times 10^6$ Hz at room temperature. Particles having a dielectric constant in the range of from about 4 to about 100 are particularly suited for use in the method of the invention; however, any material which holds a charge well can be used in the method. The insulating particles can be titanium dioxide, zinc oxide, zirconia, alumina, silica, wax, polymer, inorganic oxide or organic material particles or mixtures thereof.

The starting powder can also be a non-electrically conductive aerosol made up of particles which are themselves electrically conductive, but present at such a dilution that no continuous path for conduction of electricity exists within the aerosol. As used herein in the specification and claims, the term aerosol refers to a finely divided powder in a continuous phase gaseous medium and conductive particle dilutions which result in a non-electrically conductive aerosol are in the range of from about 0.0001 lb/ft$^3$ to about 0.1 lb/ft$^3$. Electrically conductive particles appropriate for use in such a non-electrically conductive aerosol are carbon black or metallic particles or mixtures thereof. Metallic particles can include particles of metals and their alloys such as aluminum, copper, brass and the like and mixtures thereof.

The method of the invention is useful in grinding powders to particle sizes in the micron range and especially in the submicron range, i.e., in the range of from about 0.01μ to about 1.0μ under fairly dilute conditions such as particle concentrations in the range of from about 100:1 to about 4:1 fluid to solids ratio wt/wt where conventional grinding processes often fuse individual particles together rather than comminuting them into smaller particles.

The starting powder can be characterized by a starting powder particle size less than about 1 cm. The closer the starting powder particle size is to the milled powder particle size, the more efficient the milling process will be. The first and second milled powders can be characterized by first and second milled powder particle sizes in the range of from about 0.01μ to about 1000μ, more preferably in the range of from about 0.05μ to about 100μ and most preferably in the range of from about 0.1μ to about 10μ.

The starting powder can be electrostatically charged by providing a milling fluid and charge generator and flowing the milling fluid through the charge generator so that the milling fluid becomes electrostatically charged. The milling fluid imparts kinetic energy to the starting powder to result in comminution of the starting powder and can be selected from among nearly any fluid depending upon the particular characteristics of the powder being milled, such as powder reactivity, flammability and explosion hazard as considered in conjunction with requirements for milling efficiency of the milling fluid. The milling fluid can be compressed air or superheated steam. Hydrogen gas exhibits a high potential velocity upon expansion and is a highly efficient milling fluid for powders where explosion hazard is not a consideration. If explosion hazard, particle reactivity or flammability are important considerations, fairly chemically nonreactive gases such as nitrogen, xenon or argon can be used as the milling fluid. Depending upon the particular requirements for the milling fluid, mixtures of the already-described gases can also be used.

The charge generator can be a high voltage source capable of providing a DC voltage in the range of from about 10,000 volts to about 1,000,000 volts, more preferably in the range of from about 10,000 volts to about 500,000 volts and most preferably in the range of from about10,000 volts to about 100,000 volts. The charge generator can also be an AC high voltage source providing an AC voltage in the range of from about 10,000 volts rms to about 100,000 volts rms at a frequency of from about 1 Hz to about 10,000 Hz.

Alternatively, a charge generator, such as those already described, can be used to impart charge directly to the starting powder.

The method of the invention is compatible with any milling apparatus or method as known to one skilled in the art including a jet mill or autogenous grinding process.

In order to further illustrate the present invention, the following example is provided. The particular compounds, processes and conditions utilized in the example are meant to be illustrative of the present invention and are not limited thereto.

Example 1

The following example is provided to demonstrate how a pigment powder milled according to the method of the invention displays superior chemical inertness when used in a paint and superior recovery efficiency after milling by comparison with a pigment powder milled conventionally using an amine additive.

A standard enamel grade $TiO_2$ pigment was prepared according to the following steps from a raw pigment obtained from oxidation of $TiCl_4$ and $AlCl_3$. The raw pigment was dispersed in water with addition of 0.25% wt/wt of an inorganic dispersant, and the pH was adjusted to 10 using sodium hydroxide. The dispersed pigment was sandmilled for eight minutes with 10–40 mesh silica sand to deagglomerate the pigment. An amount of sodium aluminate equivalent to 1.4% wt/wt $Al_2O_3$ was added to the pigment. Sulfuric acid was then added in an amount sufficient to neutralize twice the alumina added. Then additional sodium aluminate was added to bring the total $Al_2O_3$ added to 2.8% wt. with respect to wt. dispersed solids. Finally, the pH was adjusted to 7.0 by addition of 1 normal acid and 1 normal caustic.

The resulting aqueous slurry was filtered, repulped with additional water and dewatered with an additional filtration step to remove soluble salts from the pigment. The washed filtercake thus obtained was dried with a conventional gas fired dryer and the dried product was divided into two equal samples.

The two equal samples were then jet milled. One sample was jet milled according to conventional practice using an amine additive and the other sample was electrostatically charged and then jet milled.

The first sample was treated with 0.25% wt. with respect to wt. dispersed solids triethanol amine and jet milled with super heated steam.

The second sample was further subdivided into two equal parts. The first part was charged to 15,000 KV/inch using a hand-held voltage source, and jet milled. The second part was simultaneously equally and oppositely charged and milled in a separate jet mill. The oppositely charged first and second parts were then collected together in a single cyclone collector yielding a collected second sample.

The performances of the amine-treated first sample and the electrostatically processed second sample in a paint were compared. The first and second samples were each separately incorporated into a two part epoxy paint. The paint containing the amine-treated first sample exhibited undesirable gellation after one week caused by the amine additive to the pigment. The paint containing the electrostatically processed second sample exhibited no gellation or other undesirable side effects of pigment addition.

Collection efficiency after jet milling was also compared for the amine-treated first sample and the electrostatically processed second sample. About 90% of the amine-treated first sample was recovered from the jet milling step, while about 99% of the electrostatically processed second sample was recovered from the jet milling step.

What is claimed is:

1. A method for producing a milled powder comprising the steps of providing a starting powder, imparting an electrostatic charge to said starting powder to form a charged powder, and milling said charged powder to produce a milled powder, wherein the step of imparting an electrostatic charge to said starting powder further comprises:

(a) providing a charge generator and a milling fluid; and (b) flowing said milling fluid through said charge generator so that said milling fluid becomes electrostatically charged.

2. The method of claim 1 further comprising steps of:

(4) providing a second starting powder;

(5) imparting a second electrostatic charge opposite to said first electrostatic charge to said second starting powder to form a second charged powder;

(6) milling said second charged powder to produce a second milled powder;

(7) combining said second milled powder with a substantially equal quantity of said milled powder to form a product powder; and (8) collecting said product powder.

3. The method of claim 2 wherein said second milled powder is further characterized by a second milled powder particle size in the range of from about 0.01μ to about 1000μ.

4. The method of claim 2 wherein said step (8) of collecting said product powder further includes steps of providing a product powder collector selected from the group consisting of a cyclone, a bag filter and settling chamber collector.

5. The method of claim 1 wherein said starting powder is non-electrically conductive.

6. The method of claim 5 wherein said starting powder further includes starting powder particles and wherein individual starting powder particles are insulating particles.

7. The method of claim 6 wherein said insulating particles are further characterized by a dielectric constant and said dielectric constant is greater than about 1.5.

8. The method of claim 7 wherein said insulating particles are selected from the group consisting of titanium dioxide, zinc oxide, zirconia, alumina, silica, wax, polymer, inorganic oxide and organic particles and mixtures thereof.

9. The method of claim 5 wherein said starting powder is a non-electrically conductive aerosol including individual electrically conductive particles.

10. The method of claim 9 wherein said electrically conductive particles are selected from the group consisting of carbon black and metallic particles and mixtures thereof.

11. The method of claim 1 wherein said starting powder is further characterized by a starting powder particle size less than about 1 cm.

12. The method of claim 1 wherein said milling fluid is selected from the group consisting of superheated steam, air, hydrogen, nitrogen, xenon and argon and mixtures thereof.

13. The method of claim 1 wherein said charge generator is a high voltage source.

14. The method of claim 13 wherein said high voltage source provides a DC voltage in the range of from about 10,000 volts to about 1,000,000 volts.

15. The method of claim 13 wherein said high voltage source provides an AC voltage in the range of from about 10,000 volts rms to about 100,000 volts rms at a frequency of from about 1 Hz to about 10,000 Hz.

16. The method of claim 1 wherein said step of milling said charged powder further includes providing a mill and a milling fluid to impart kinetic energy to said starting powder to result in comminution of said starting powder.

17. The method of claim 16 wherein said mill is a jet mill.

18. The method of claim 1 wherein said step of milling is performed using autogenous grinding.

19. The method of claim 1 wherein said milled powder is further characterized by a milled powder particle size in the range of from about $0.1\mu$ to about $1000\mu$.

20. A method for producing a milled powder comprising the steps of providing a starting powder, imparting an electrostatic charge to said starting powder to form a charged powder, and milling said charged powder to produce a milled powder, wherein the step of imparting an electrostatic charge to said starting powder further comprises:

(a) providing a charge generator; and (b) directly charging said starting powder.

* * * * *